United States Patent
Vaughan et al.

(10) Patent No.: US 9,928,376 B2
(45) Date of Patent: Mar. 27, 2018

(54) REMOTE SLIDE PRESENTATION

(75) Inventors: Paul Bradford Vaughan, Pittsburgh, PA (US); Michael Richard Peirce, Lewis Center, OH (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 13/465,825

(22) Filed: May 7, 2012

(65) Prior Publication Data

US 2012/0284774 A1 Nov. 8, 2012

Related U.S. Application Data

(63) Continuation of application No. 12/345,533, filed on Dec. 29, 2008, now Pat. No. 8,195,768.

(51) Int. Cl.
| | | |
|---|---|---|
| *G06F 15/16* | (2006.01) | |
| *G06F 21/62* | (2013.01) | |
| *G06F 3/0482* | (2013.01) | |
| *H04M 3/56* | (2006.01) | |

(52) U.S. Cl.
CPC ........ *G06F 21/6218* (2013.01); *G06F 3/0482* (2013.01); *H04M 3/567* (2013.01)

(58) Field of Classification Search
USPC ................ 709/219, 201, 202, 203, 227, 217
See application file for complete search history.

(56) References Cited

U.S. PATENT DOCUMENTS

| | | | |
|---|---|---|---|
| 6,081,262 A | 6/2000 | Gill et al. | |
| 6,108,687 A * | 8/2000 | Craig | ............................ 709/203 |
| 6,502,126 B1 * | 12/2002 | Pendakur | ....................... 709/204 |
| 6,507,865 B1 | 1/2003 | Hanson et al. | |
| 6,523,063 B1 * | 2/2003 | Miller | .................. G06Q 10/107 709/204 |
| 6,665,835 B1 | 12/2003 | Gutfreung et al. | |
| 6,760,749 B1 * | 7/2004 | Dunlap et al. | ................ 709/204 |
| 6,789,228 B1 * | 9/2004 | Merril et al. | .................. 715/243 |
| 6,910,049 B2 | 6/2005 | Fenton et al. | |
| 7,003,587 B1 | 2/2006 | Battat et al. | |
| 7,007,098 B1 | 2/2006 | Smyth et al. | |
| 7,007,235 B1 | 2/2006 | Hussein et al. | |
| 7,167,182 B2 | 1/2007 | Butler | |
| 7,245,660 B2 | 7/2007 | Yona et al. | |
| 7,454,460 B2 | 11/2008 | Ivashin | |
| 7,536,705 B1 * | 5/2009 | Boucher | ............. H04L 12/1836 725/112 |
| 7,590,750 B2 * | 9/2009 | Adbo | .................. H04L 65/4084 709/203 |
| 7,996,436 B2 | 8/2011 | Schneider et al. | |
| 2002/0083137 A1 | 6/2002 | Rogers et al. | |
| 2002/0194194 A1 | 12/2002 | Fenton et al. | |
| 2003/0013483 A1 | 1/2003 | Ausems et al. | |
| 2003/0123537 A1 | 7/2003 | Yona et al. | |
| 2003/0217181 A1 * | 11/2003 | Kiiskinen | ..................... 709/248 |
| 2004/0215830 A1 | 10/2004 | Shenfield | |

(Continued)

*Primary Examiner* — Lan-Dai T Truong
(74) *Attorney, Agent, or Firm* — Fletcher Yoder PC

(57) ABSTRACT

Techniques for remotely viewing a presentation are disclosed. In accordance with these techniques, a host device executing a presentation application makes a presentation available over a network. In one embodiment, a remote device receives presentation data corresponding to a currently displayed slide of the presentation. The remote device may then display a representation of the currently displayed slide at the remote location.

18 Claims, 9 Drawing Sheets

(56) References Cited

U.S. PATENT DOCUMENTS

| | | |
|---|---|---|
| 2004/0221010 A1 | 11/2004 | Butler |
| 2004/0226047 A1 | 11/2004 | Lin et al. |
| 2004/0230651 A1 | 11/2004 | Ivashin |
| 2004/0230655 A1 | 11/2004 | Li et al. |
| 2004/0230668 A1 | 11/2004 | Carnahan et al. |
| 2006/0041686 A1* | 2/2006 | Caspi .................. H04L 67/1095 709/248 |
| 2006/0235927 A1* | 10/2006 | Bhakta et al. ................. 709/204 |
| 2007/0130177 A1 | 6/2007 | Schneider et al. |
| 2007/0220412 A1* | 9/2007 | Muhlhauser ............. G09B 5/00 715/203 |
| 2008/0086689 A1 | 4/2008 | Berkley et al. |
| 2008/0168355 A1 | 7/2008 | Dunlap et al. |
| 2008/0201751 A1* | 8/2008 | Ahmed .............. H04N 21/4312 725/109 |
| 2009/0164875 A1* | 6/2009 | Rance et al. .................. 715/201 |
| 2010/0141838 A1 | 6/2010 | Steggles |
| 2010/0169790 A1 | 7/2010 | Vaughan et al. |
| 2010/0169951 A1 | 7/2010 | Vaughan et al. |

* cited by examiner ical Field

The present invention relates generally to providing a remotely accessible presentation.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. Typically, these presentations are composed of "slides" that are sequentially presented in a specified order.

It may also be desirable to concurrently communicate the information to people who are not present at the site of the presentation. However, it may be difficult to provide the information to remote viewers in such a concurrent manner without special software or services.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for making a presentation available for remote viewing. For example, the presentation may be made available via a conventional web browser or other application capable of accessing the presentation contents over a network. In one embodiment, a presentation application on a network may include a web server. When a presentation is made using the presentation application, a remote computer running a viewing application, such as a web browser, may communicate with the web server to receive the presentation as it is presented. In one embodiment, static images of each slide and build or step of a slide are transmitted to remote viewers concurrently with the local presentation of the slides and slide builds at the site of the presentation application. In such an embodiment, the static images may exclude animations, video, and audio that might be displayed on at the local site of the presentation application. In addition, in certain embodiments, the images transmitted for remote viewing may be scaled or sized based on various considerations, such as network load or bandwidth, the type of receiving application or device, and so forth.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to providing remote access to a presentation. In certain embodiments, the presentation may be made available over a network, such as a peer-to-peer network. For example, in one embodiment, a presentation application may include server functionality so that a viewing application, such as a web browser or other application suitable for viewing data received over a network, may be used to access presentation materials over a network. With this in mind, an example of a suitable device for use in accordance with the present disclosure is as follows.

Figure 1:
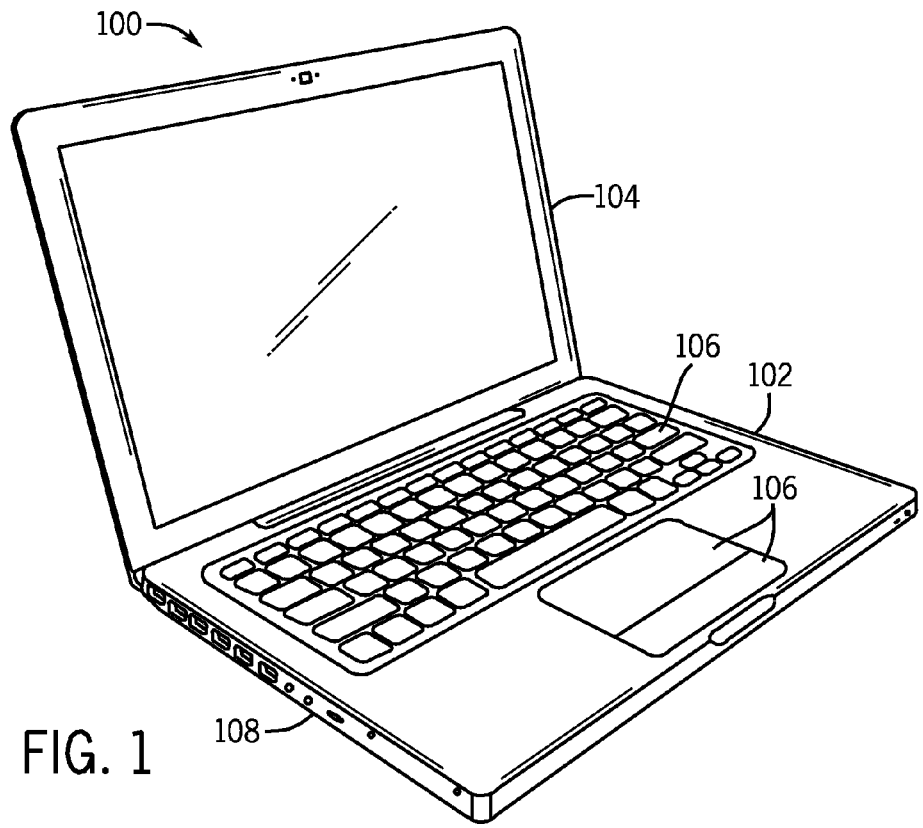
FIG. 1 is a perspective view illustrating an electronic device in accordance with one embodiment of the present invention.

An exemplary electronic device 100 is illustrated in FIG. 1 in accordance with one embodiment of the present invention. In some embodiments, including the presently illustrated embodiment, the device 100 may be processor-based system, such as a laptop or desktop computer, suitable for displaying presentations, such as using the Keynote® software package available from Apple Inc. as part of the iWork® productivity package. Other processor-based systems suitable for displaying presentations may include servers, thin-client workstations, portable or handheld devices capable of running presentation software, or the like. By way of example, the electronic device 100 may be a model of a MacBook®, MacBook® Pro, MacBook Air®, iMac®, Mac® mini, or Mac Pro® available from Apple Inc.

In the presently illustrated embodiment, the exemplary electronic device 100 includes an enclosure or housing 102, a display 104, input structures 106, and input/output connectors 108. The enclosure 102 may be formed from plastic, metal, composite materials, or other suitable materials, or any combination thereof. The enclosure 102 may protect the interior components of the electronic device 100 from physical damage, and may also shield the interior components from electromagnetic interference.

The display 104 may be a liquid crystal display (LCD), cathode ray tube (CRT) or other suitable display type. For example, in one embodiment, a suitable LCD display may be based on light emitting diodes (LED) or organic light emitting diodes (OLED). In certain implementations, the display 104 may be controlled by graphics circuitry, such as a graphics card or chipset including a graphics processing unit (GPU) and associated memory and buffers.

In one embodiment, one or more of the input structures 106 are configured to control the device 100 or applications running on the device 100. Embodiments of the electronic device 100 may include any number of input structures 106, including buttons, switches, a mouse, a control or touch pad, a keyboard, a keypad, a touchscreen, or any other suitable input structures. The input structures 106 may operate to control functions of the electronic device 100 or applications running on the device 100 and/or any interfaces or devices connected to or used by the electronic device 100. For example, the input structures 106 may allow a user to navigate a displayed user interface or application interface.

The exemplary device 100 may also include various input and output ports 108 to allow connection of additional devices. For example, the device 100 may include any number of input and/or output ports 108, such as headphone and headset jacks, video ports, universal serial bus (USB) ports, IEEE-1394 ports, Ethernet and modem ports, and AC and/or DC power connectors. Further, the electronic device 100 may use the input and output ports 108 to connect to and send or receive data with any other device, such as a modem, external display, projector, networked computers, printers, or the like. For example, in one embodiment, the electronic device 100 may connect to a projector via a USB or VGA connection to project images, such as to project slides of a presentation.

Figure 2:
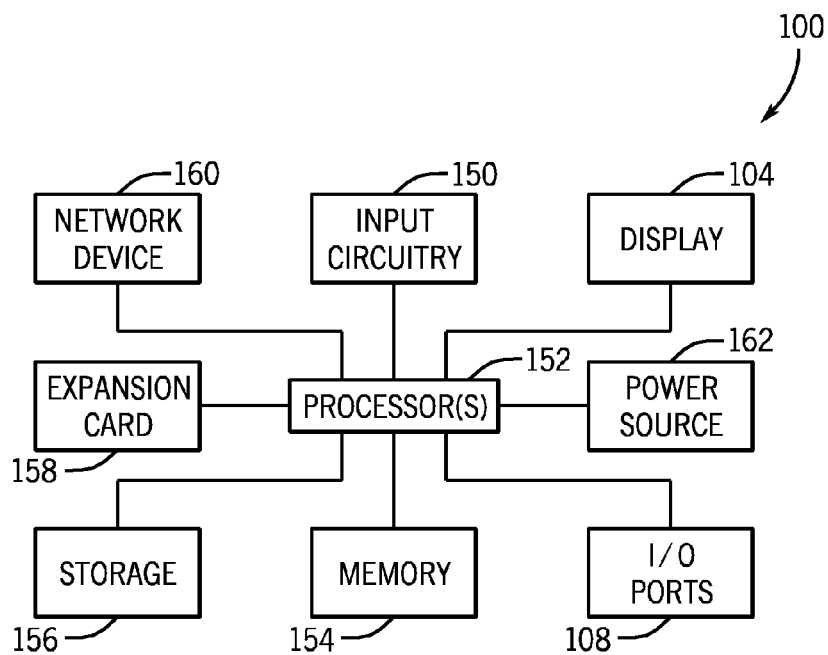
FIG. 2 is a simplified block diagram illustrating components of an electronic device in accordance with one embodiment of the present invention.

The electronic device 100 includes various internal components which contribute to the function of the device 100. FIG. 2 is a block diagram illustrating the components that may be present in the electronic device 100 and which may allow the device 100 to function in accordance with the techniques discussed herein. Those of ordinary skill in the art will appreciate that the various functional blocks shown in FIG. 2 may comprise hardware elements (including circuitry), software elements (including computer code stored on a computer-readable medium such as a RAM, ROM, hard disk, optical disk, or solid state memory device) or a combination of both hardware and software elements. It should further be noted that FIG. 2 is merely one example of a particular implementation and is merely intended to illustrate the types of components that may be present in a device 100 that allow the device 100 to function in accordance with the present techniques.

In the presently illustrated embodiment, the components may include the display 104 and the I/O ports 108. In addition, as discussed in greater detail below, the components may include input circuitry 150, one or more processors 152, a memory device 154, a non-volatile storage 156, expansion card(s) 158, a networking device 160, and a power source 162.

The input circuitry 150 may include circuitry and/or electrical pathways by which user interactions with one or more input structures 106 are conveyed to the processor(s) 152. For example, user interaction with the input structures 106, such as to interact with a user or application interface displayed on the display 104, may generate electrical signals indicative of the user input. These input signals may be routed via the input circuitry 150, such as an input hub or bus, to the processor(s) 152 for further processing.

The processor(s) 152 may provide the processing capability to execute the operating system, programs, user and application interfaces, and any other functions of the electronic device 100. The processor(s) 152 may include one or more microprocessors, such as one or more "general-purpose" microprocessors, one or more special-purpose microprocessors and/or ASICS, a microcontroller, or some combination thereof. For example, the processor 152 may include one or more instruction processors, as well as graphics processors, audio processors, video processors, and/or related chip sets.

As noted above, the components may also include a computer-readable media, such as a memory 154. Such a memory 154 may include a volatile memory, such as random access memory (RAM), and/or a non-volatile memory, such as read-only memory (ROM). The memory 154 may store a variety of information and may be used for various purposes. For example, the memory 154 may store firmware for the electronic device 100 (such as a basic input/output instruction or operating system instructions), other programs that enable various functions of the electronic device 100, user interface functions, processor functions, and may be used for buffering or caching during operation of the electronic device 100.

The components may further include other computer-readable media, such as a non-volatile storage 156. For example, a non-volatile storage 156 may include flash memory, a hard drive, or any other suitable optical, magnetic, or solid-state storage medium, or a combination thereof. The non-volatile storage 156 may be used to physically encode and store data files such as media content (e.g., music, image, video, and/or presentation files), software (e.g., a presentation application for implementing the presently disclosed techniques on electronic device 100), wireless connection information (e.g., information that may enable the electronic device 100 to establish a wireless connection, such as a telephone or wireless network connection), and any other suitable data. In some embodiments, non-volatile storage 156 may store programs or applications executable on the processor 152, maintain files formatted to be read and edited by one or more of the applications, and store any additional files that may aid the operation of one or more applications (e.g., files with metadata). It will be understood that data may be stored interchangeably in memory 154 and storage device 156, based on the operation of the electronic device 100.

The embodiment illustrated in FIG. 2 may also include one or more card slots. The card slots may be configured to receive an expansion card 158 that may be used to add functionality to the electronic device 100, such as additional memory, I/O functionality, or networking capability. Such an expansion card 158 may connect to the device through any type of suitable connector, and may be accessed internally or external to the enclosure 102. For example, in one embodiment, the expansion card 158 may be flash memory card, such as a SecureDigital (SD) card, mini- or microSD, CompactFlash card, Multimedia card (MMC), or the like.

The components depicted in FIG. 2 also include a network device 160, such as a network controller or a network interface card (NIC). In one embodiment, the network device 160 may be a wireless NIC providing wireless connectivity over any 802.11 standard or any other suitable wireless networking standard. The network device 160 may allow the electronic device 100 to communicate over a network, such as a local area network (LAN), wide area network (WAN), or the Internet. Further, the electronic device 100 may connect to and send or receive data with any device on the network, such as portable electronic devices, personal computers, projectors, printers, and so forth. Alternatively, in some embodiments, the electronic device 100 may not include a network device 160. In such an embodiment, a NIC may be added into card slot 158 to provide similar networking capability as described above.

Further, the components may also include a power source 162. In one embodiment, the power source 162 may be one or more batteries, such as a lithium-ion polymer battery. The battery may be user-removable or may be secured within the housing 102, and may be rechargeable. Additionally, the power source 162 may include AC power, such as provided by an electrical outlet, and the electronic device 100 may be connected to the power source 162 via a power adapter. This power adapter may also be used to recharge one or more batteries if present.

Figure 3:
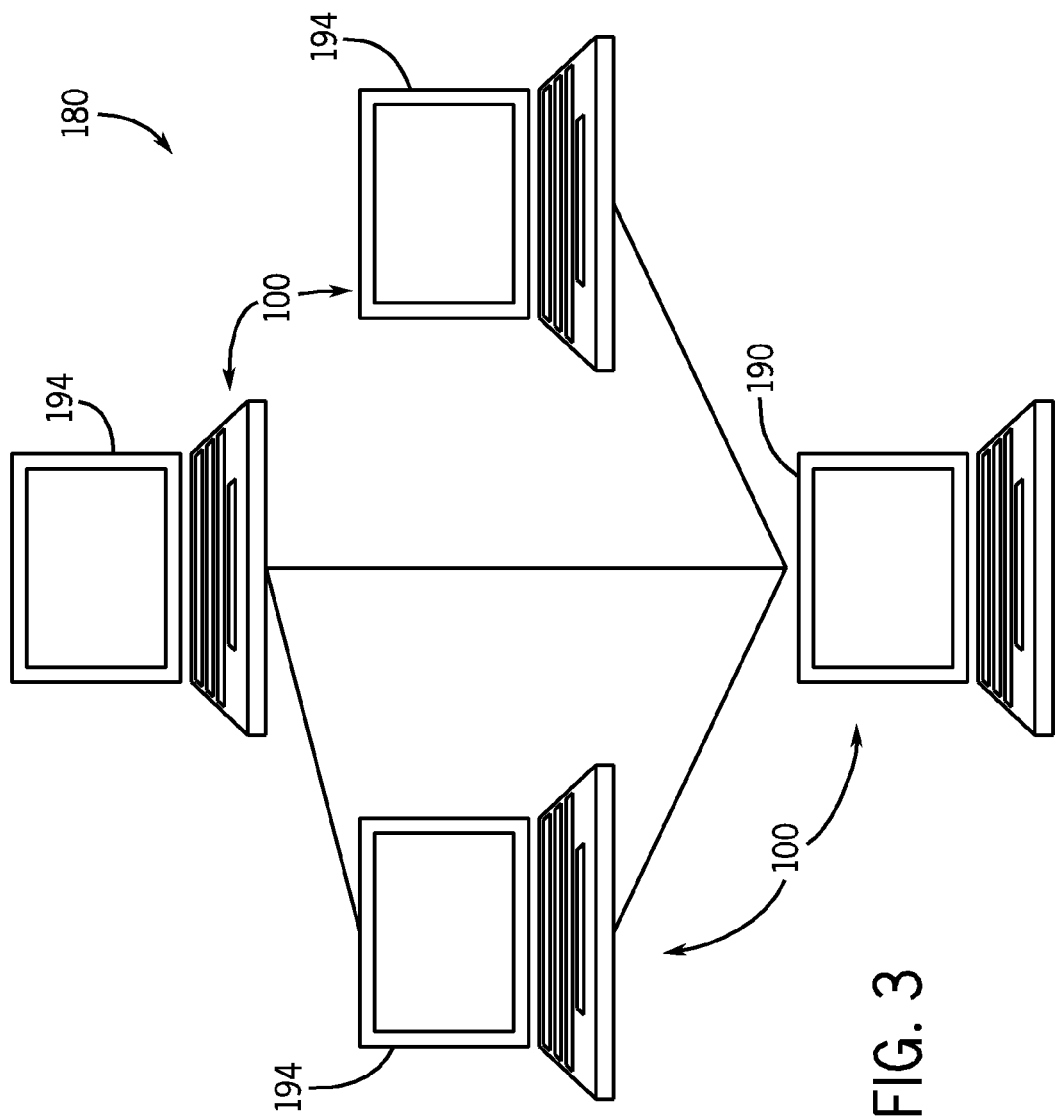
FIG. 3 depicts a simplified representation of a network in accordance with one embodiment of the present invention.

As noted above, an electronic device 100 may include network functionality, either through an integral network device 160 or via an expansion card 158. Thus, in certain implementations, an electronic device 100 having such networking capabilities may communicate with other network capable devices over a suitable network, such as a server-based network or a peer-to-peer network. For example, turning to FIG. 3, an example of a peer-to-peer network 180 configuration is depicted. In this example, each network capable electronic device 100 may function as a peer node of the network 180, though each node does not necessarily directly communicate to every other node of the network 180.

The network 180 may be a private network (such as an internal network for a business, conference, school, and so forth), a virtual private network (VPN)(such as an encrypted, controlled access network run on otherwise public infrastructure), or a public network (such as the Internet). For example, in one embodiment the network 180 may be configured as an Internet Protocol (IP) network over which Hypertext Transfer Protocol (HTTP) may be used to communicate packets of data between the devices 100 on the network. It should be appreciated that though the present example depicts the use of a peer-to-peer network, in other embodiments a client-server type network, i.e., a network where communication is generally via one or more central servers) may also be employed in conjunction with the presently described techniques.

In the present example, an electronic device 100 on the network 180 may store and execute a presentation application to play a presentation, such as a sequence of slides. This electronic device 100 essentially functions as a host device 190 for the presentation and may be connected to a projector or other devices to publicly display the presentation to an audience present in the same room. For example, the host device 190 may be a laptop or desktop computer running a presentation application, such as Keynote® from Apple Inc. In accordance with the present technique, the presentation may also be viewed via other electronic devices 100 that are on the network 180, i.e., on remote devices 194. In one embodiment, the remote devices 194 may run a web browser application (e.g., an application that formats HTML information for display, such as Safari® from Apple Inc., Internet Explorer®, Firefox®, and so forth) or any other application suitable for processing and/or displaying images received over the network 180.

In one embodiment, the host device 190, in addition to running a presentation application, also acts as a web server, i.e., routines running on the host device 190 may receive HTTP requests from clients and may provide HTTP responses and requested data content, in reply. Such web server functionality may be provided via a program or application stored and executed on the host device 190. In such an example, the web server application on the host device 190 may function to accept HTTP requests from web browser applications running on remote devices 194 and to provide HTTP responses along with presentation data. In one embodiment, the routines and code corresponding to the web server application are part of the presentation application itself. In other embodiments, the web server application may be separate from the presentation application.

Figure 4:
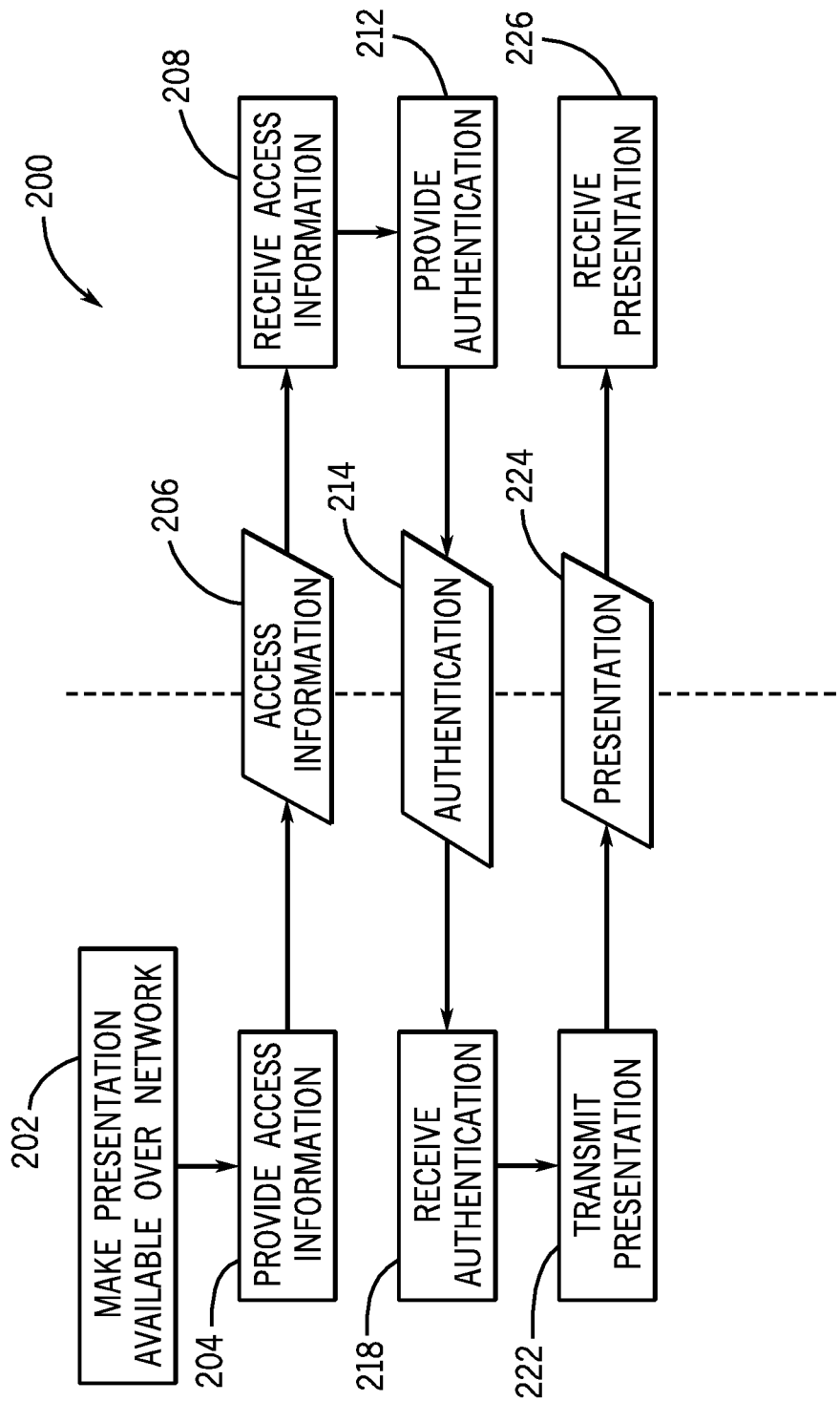
FIG. 4 is a flowchart depicting remote access of a presentation, in accordance with one embodiment of the present invention.

With the foregoing discussion in mind, various techniques and algorithms for implementing aspects of the present disclosure on electronic devices 100 and accompanying hardware and memory devices are discussed below. Turning to FIG. 4, a flowchart 200 depicting acts performed by the host device 190 and remote devices 194 in sharing a presentation, such as a slideshow, are provided in accordance with one embodiment. In this example, the host device 190 is running a presentation application. The presentation application may be configured to make a presentation available remotely, such as over a network (block 202). In one implementation, this may be accomplished by a user selecting an option from a drop-down menu or other user interface feature of the presentation application. As noted above, the presentation application may use web server functionality built into the presentation application or otherwise available on the host device 190 to provide remote access to the presentation.

In certain embodiments, aspects of the remote access to the presentation may be configurable. For example, the presentation application may display one or more remote access options when a user selects to make a presentation remotely available. One such option may allow the user to specify a network device and/or uniform resource locator (URL) to use to make the presentation available on a network 180. Another option may allow a user to specify whether the presentation is advertised, publicly announced or searchable on a network 180, such as using the Bonjour® protocol available from Apple Inc. Other options may activate the use of encryption for presentation data transmitted on a network 180. Another example of an option may specify whether a remote device 194 receiving the presentation data displays the presentation in a window or in a full-screen mode. While the preceding discussion describes certain options that may be configurable in setting up a presentation for remote access, this discussion is not exhaustive and other options may also be available and are included in the scope of the present disclosure.

In addition, in certain embodiments, the presentation application and/or web server may provide an option to limit or otherwise control access to the presentation data. For example, access information 206 (i.e., a login, password, pass code, or other authenticator) may be required to remotely view the presentation. In such embodiments, the user or routines executing on the host device 190 may specify the authentication information that may be used to remotely view the presentation. For example, the user and/or routines running on the host device 190 may generate or allow entry of a login or pass code which may be used by a remote device 194 to access the presentation. In one embodiment, the generation of the authentication information, the receipt of the authentication information, and/or the remote distribution of the presentation data may be handled by web server functionality provided by the presentation application. In other embodiments, this functionality may be provided by a separate web server routine running on the host device 190.

In embodiments where remote access is limited or controlled, the access information 206 may be provided (block 204) to a user of a remote device 194 by various means. For example, the access information 206 may be received (block 208) at the remote device 194 via an e-mail or text message to the user of the remote device 194. Alternatively, in other embodiments the user of the remote device 194 may receive (block 208) the access information 206 in a verbal communication (such as via a phone call or on a conference call occurring concurrently with the presentation). In other embodiments, the access information 206 may already be known by the user of the remote device 194 (such as a login or password specific to that user) and may be recognized at the web server running on the host device as being an allowed viewer. In certain embodiments, knowledge of the URL may also be controlled or limited to control remote access to the presentation.

In some implementations, the remote device 194 or the user of the remote device 194 may use the access information 206 to provide (block 212) an authentication 212 to the web server running on the host device 190. For example, in one implementation, the remote device 194 may receive an e-mail or text message containing a URL and a pass code for remotely viewing the presentation playing on the host device 190. To view the presentation, a user of the remote device 194 may open a web browser or other application for accessing network content and may direct the browser to the provided URL. For example, in one embodiment the URL is provided as an active hyperlink in an e-mail or other message and the user of the remote device 194 may select or clink on the URL to open an instance of a web browser to the web page specified by the URL.

When prompted, the user may input the pass code as authentication 214. In this example, the web server may receive (block 216) the authentication and transmit (block 222) presentation data 224 to the remote devices 194 based on the authentication. The remote device 194, in turn, may receive (block 226) the presentation data 224 and display the presentation data 224 for the user. In one implementation, the presentation data 224 is HTTP formatted data including image files of a currently displayed slide which are received and displayed by a suitable application, such as a web browser, running on the remote device 194. In general, the presentation data may be received and displayed by an application running on the remote device 194 and suitable for receiving data over a network and for displaying images based on the received data.

In one implementation, the presentation data 224 includes data, such as an image file, representing a slide or slide build currently displayed by the presentation application at the host device 190. As will be appreciated such slide builds (such as animation steps) may be used to animate or introduce textual or graphical elements on a slide in incremental or step-wise builds. For example, a slide may list a number of textual elements provided as bullet points, but each bullet point may be introduced as a different build of the slide, so that a time interval or user input causes an animation which results in the next build of the slide being displayed. In this way, the slide may be constructed so that it initially appears with a title but no bullet points, then a series of step-wise builds each result in the introduction and display of another bullet point on the slide until the steps are complete and the next slide is displayed. Similarly, a slide may include discrete builds in which one or more graphical or textual elements are animated (moved, rotated, scaled, faded in, faded out, and so forth) at each build. Thus, as used herein, it should be understood that the term slide should be understood as encompassing a slide and any or all of the build permutations of that slide, i.e., the slide after animation build 1, animation build 2, and so forth.

In certain embodiments, the representation generated and displayed at the remote device 194 from such presentation data 224 may not include video and/or audio components found on the currently presented slide or slide build, i.e., the representation is static. In such an implementation a picture or image may be displayed in place of a video on the representation of the slide displayed at the remote device 194. Likewise, animation and/or other effects may not be displayed in the static representation constructed from the presentation data 224 at the remote device 194. Instead, in such embodiments, a pre-animation slide image and a post-animation slide image may be sent as part of the presentation data 224 such that the remote device 194 displays images of the currently presented slide before and after animation with no actual animation being displayed.

For example, in an embodiment where a browser application running at the remote device 194 is used to view the presentation data 224, the presentation data 224 may be formatted as a standard web page being sent from a web server on the host device 190 to the remote device 194. In such an example, the presentation data 224 may be formatted in accordance with standard HTTP protocols suitable for transmission of a web page. Thus, in one such implementation, the presentation data 224 may include static images (e.g., .jpg images, .png images, and so forth) of a currently displayed slide or slide build which may be received and displayed at the browser application.

In such an embodiment the presentation application running on the host device 190 may include routines for generating .jpg or other static image files of each slide or slide build of the presentation and may transmit the static images to a remote browser application in a format suitable for receipt and display by the web browser. Such images files may be generated on-the-fly, i.e., as needed, or may be generated prior to transmission and cached or otherwise stored for some time interval prior to transmission. For example, the presentation application may include routines used to export image files based on the slides of the presentation and such routines may be used to generate static images files suitable for transmission to and display by a browser application running on a remote device 194. In addition, in certain embodiments, the transmitted presentation data 224 may also include additional administrative or header type information that may be typically associated with the generation and transmission of web-based data. For example, the presentation data 224 may also include an initial transmission including document info, such as document title, number of slides, number of pages (e.g., slide builds), and so forth, followed by a sequence of .jpg images (or other static image format) of the presentation slides and slide builds for display by the remote web browser.

In some implementations, the presentation application may generate static image files of different sizes, resolutions, and/or formats for each slide or slide build of the presentation. For example, to the extent that some remote devices 194 might have a higher bandwidth connection to the host device 190 than others, the web server on the host device 190 may transmit larger or higher quality static images to those remote devices 194 for which there is sufficient bandwidth and may transmit smaller or lower quality static images when network bandwidth to a remote device 194 is not suitable for transmitting larger image files. Similarly, the number of remote devices 194 attempting to access a presentation may affect the available network bandwidth and, thus, remote viewership above a certain number may cause the presentation application on the host device 190 to send reduced size static image files instead of larger static image files.

In addition, the nature of the remote device or the application employed at the remote device for viewing the presentation may determine the size, resolution and/or format of the image files sent to that respective remote device 194 by the presentation application. For example, the initial communications between a browser application running on a remote device 194 and the presentation application 190 running on a host device 190 may include information about the type of device a respective remote device 194 is, the type of application being used to display the presentation data, and/or the size or quality of the display on the respective remote device 194. Such information may then be used by the presentation application to determine what size, quality, and/or format of image files to send to each respective remote device 194.

In one embodiment, the presentation data may correspond to a currently active slide or slide build of a presentation. In such an embodiment, the displayed presentation data 224 at the remote device 194 may remain synchronized with the current slide or slide build being displayed on the host device 190. In such an embodiment, whatever portion of the presentation is displayed by the presentation application on the host device 190 will be transmitted as presentation data 224 to a remote device 194 for simultaneous display. In one embodiment in which the remote device 124 receives and displays the presentation data 224 via a web browser, asynchronous JavaScript (i.e., Ajax and XML) or other interactive web scripting techniques may be used to poll between the web browser on the remote device 194 and the web server on the host device 190 to keep the web browser in sync with the presentation application. Such asynchronous JavaScript or similar code may be distributed as an applet or other form of distributed code when the web server functionality at the host device 190 initially communicates with the viewing application on the remote device 194.

For example, in one embodiment a viewing application, such as a web browser, running on a remote device 194 periodically polls the web server running on the host device 190 to determine what slide or slide build is currently being played. In such an embodiment, the web server responds to the poll with an indication of what slide or slide build is being shown (e.g., a slide or sequence number) by the presentation application. If this indication does not correspond to the most recent image received by the viewing application (and, thus, to the image being displayed by the viewing application) the viewing application may request an image of the current slide or slide build from the web server on the host device 190. Alternatively, the web server may maintain an open communication channel to each viewing application and may push down new slide images to each viewing application when the presentation application advances the presentation.

Figure 5:
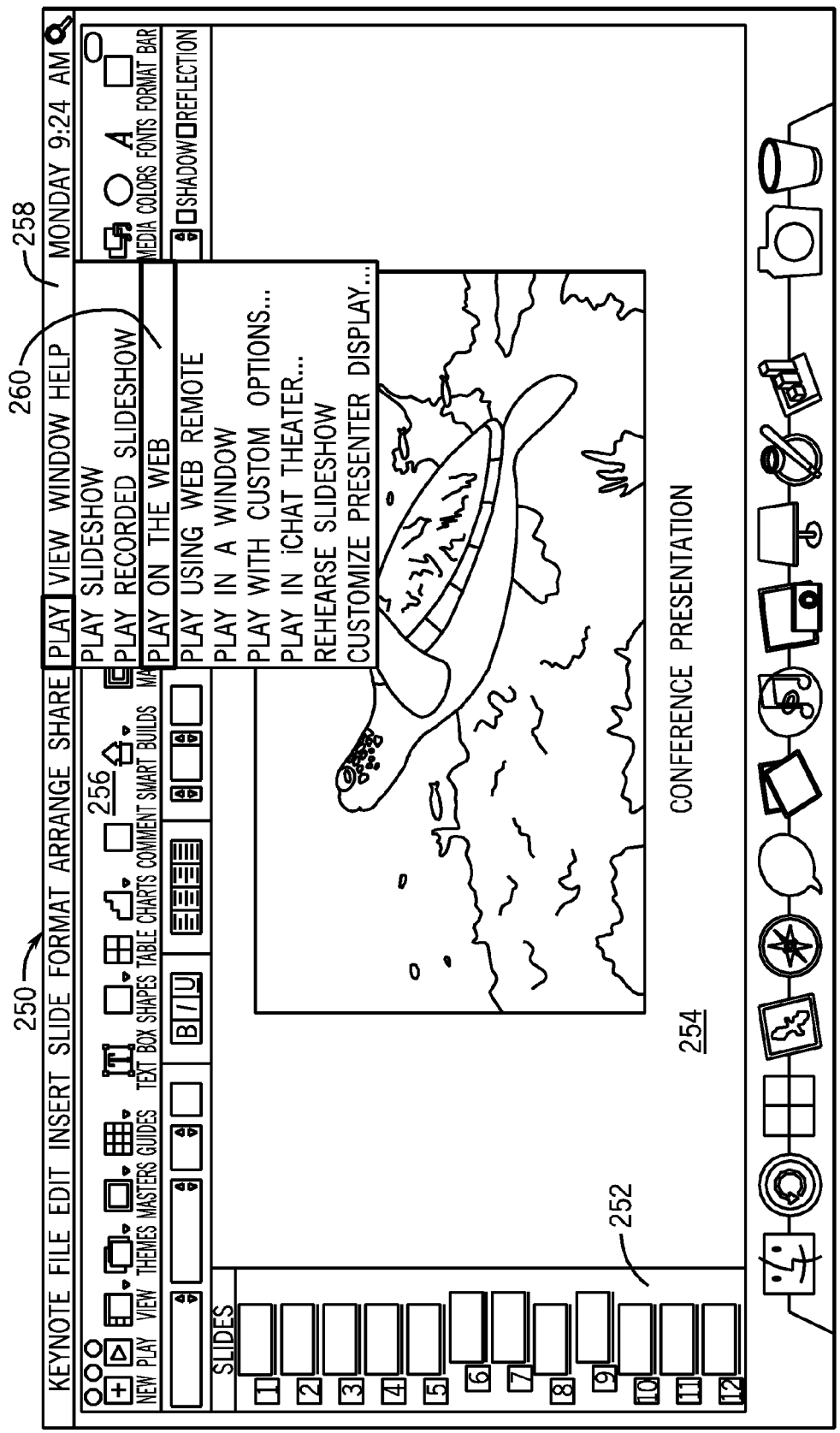
FIG. 5 depicts a screen of a presentation application in which network access is enabled, in accordance with one embodiment of the present invention.

With the foregoing in mind and turning to FIG. 5, an illustrative screen 250 of a presentation application (such as Keynote® available from Apple Inc.) is depicted in accordance with one embodiment of the invention. As noted above, the presentation application may be run on the host device 190 and may be stored as one or more executable routines in memory 154 and/or storage 156 (FIG. 2) and, when executed, may display on screen 200.

The presentation application may provide multiple modes of operation, such as an edit mode, used to create and/or edit slides, and a presentation mode, used to display slides in a format suitable for audience viewing. In some embodiments, the presentation application may provide a full-screen presentation of the slides in the presentation mode, such as over a projector, including any animations, transitions, or other properties defined for each object within the slides. In such implementations, the view of the presentation at a display 104 on the host device 190 may differ from what is projected on a screen so that the presenter may view a slide organizer 252 and/or notes that are not typically shown as part of the presentation.

In the depicted example, the screen 200 includes the slide organizer 252, a view 254 of the currently selected slide, and a toolbar 256 for creating and editing various aspects of a slide of a presentation. By using these panes, a user may select a slide of a presentation, view the slide, add and/or edit the contents of the slide, and animate or add effects related to the contents of the slide. It should be understood that the size of each pane in display screen 250 is merely illustrative, and that the relative size of each pane may be adjusted by a user.

In addition, the screen 250 includes a menu bar 258 allowing access to and selection of various presentation application functions. For example, in the depicted embodiment, the menu bar 258 includes a "Play" heading which allows a user to select various option related to playing the open presentation. One depicted option 260 allows the user to play the presentation over a network, such as via web server functionality provided as part of the presentation application.

Figure 6:
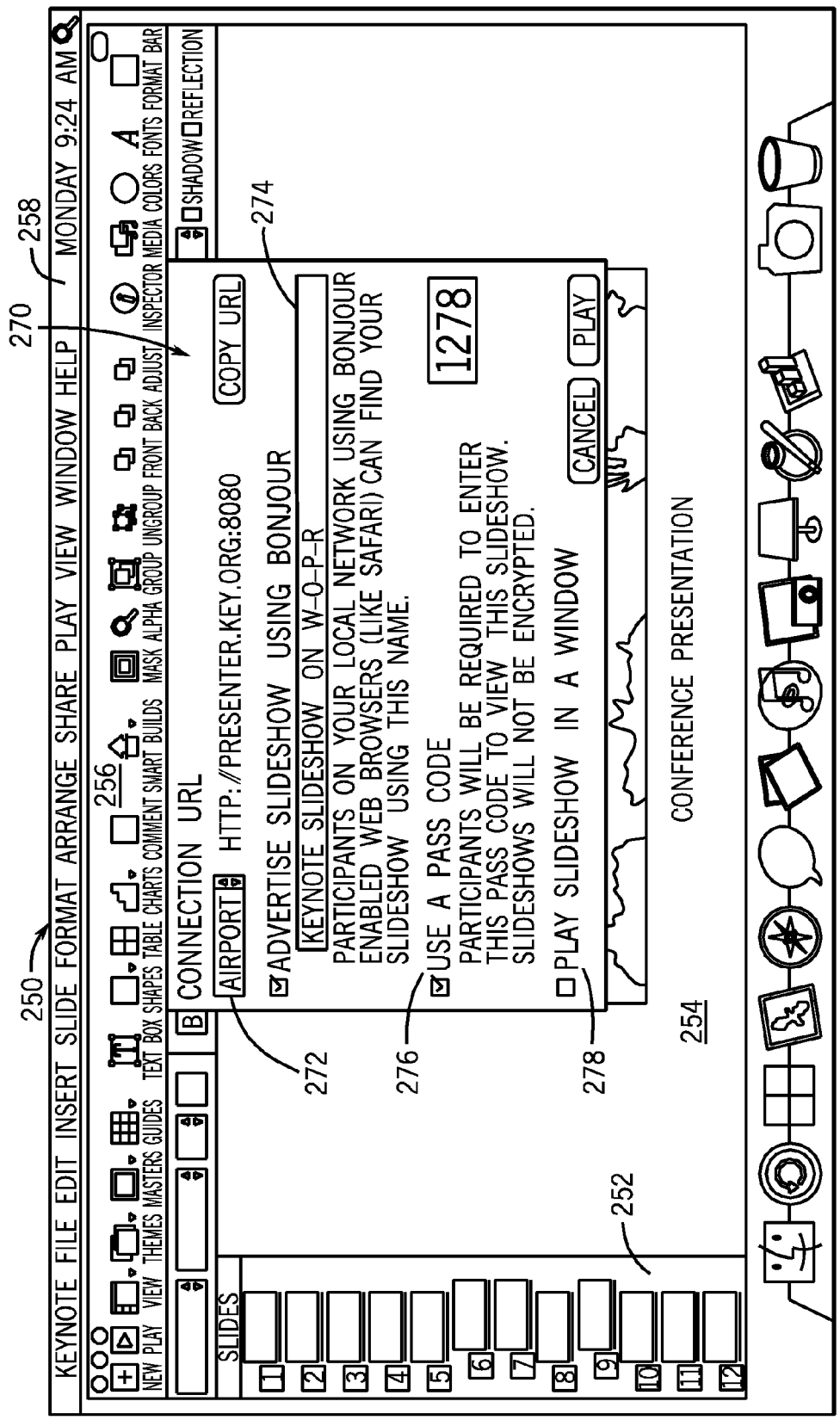
FIG. 6 depicts a screen of a presentation application in which network access is configured, in accordance with one embodiment of the present invention.

In response to user selection of the "Play on the Web" option 260, a set of options 270 may be displayed on the screen 250, as depicted in FIG. 6. For example, an option 272 to select a network device and/or URL, an option 274 to advertise the presentation on a network, an option 276 to require a pass code for remote viewing, an/or an option 278 to play the presentation in full-screen or window mode on remote devices 194 may be displayed.

Figure 7:
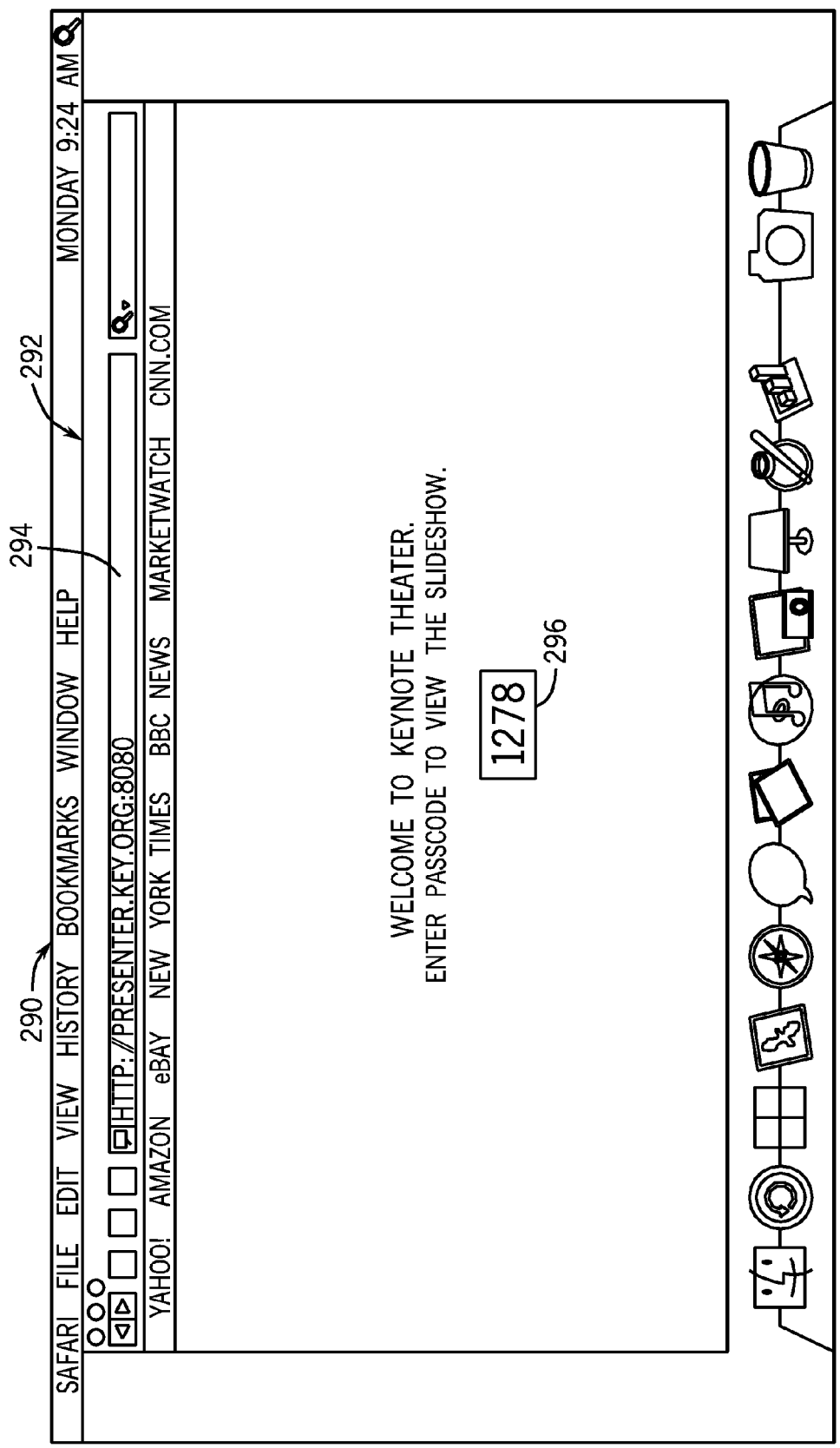
FIG. 7 depicts a screen of a web browser used to access a remote presentation, in accordance with one embodiment of the present invention.

Turning to FIG. 7, a remote screen 290 of a remote device 194 is depicted. In one embodiment, the remote screen 290 is a screen of a web browser or other general purpose application suitable for viewing presentation data received over a network (i.e., not a screen of a specialized meeting service or application). In the depicted example, the screen 250 depicts a window 292 opened by the Safari® web browser available from Apple Inc. In this web browser window 292, a URL is entered in the address bar 294 corresponding to a URL of a remote presentation hosted by a presentation application running on a host device 190. In this example, the host device 190 and the remote device 194 on which the web browser window 292 is opened are both on a network 180 (such as a peer-to-peer network).

In the depicted example, the URL entered in the address bar 294 invokes a presentation for which a pass code is required for remote viewing. To provide this pass code, the web browser window 292 provides a pass code entry field 298 where a remote viewer can enter a pass code, which may be provided by e-mail, text-message, or voice communication.

In this example, upon entry of the proper pass code, the web browser running on remote device 194 may begin receiving presentation data via a web server routine running on the host device 190. The presentation data may be displayed as representations of the slides of the presentation running on the host device 190. In one embodiment, the representations of the slides may be static, with only static images or depictions of the slide elements. In other embodiments, the representations shown on the remote device, such as on the web browser, may include dynamic elements or features of the slide. Further, in certain implementations, the presentation data used to generate representations of the presentation slides on the remote device 194 corresponds to the current slide or slide build being displayed by the presentation application on the host device 190, i.e., the local and the remote presentations are synchronized.

Figure 8:
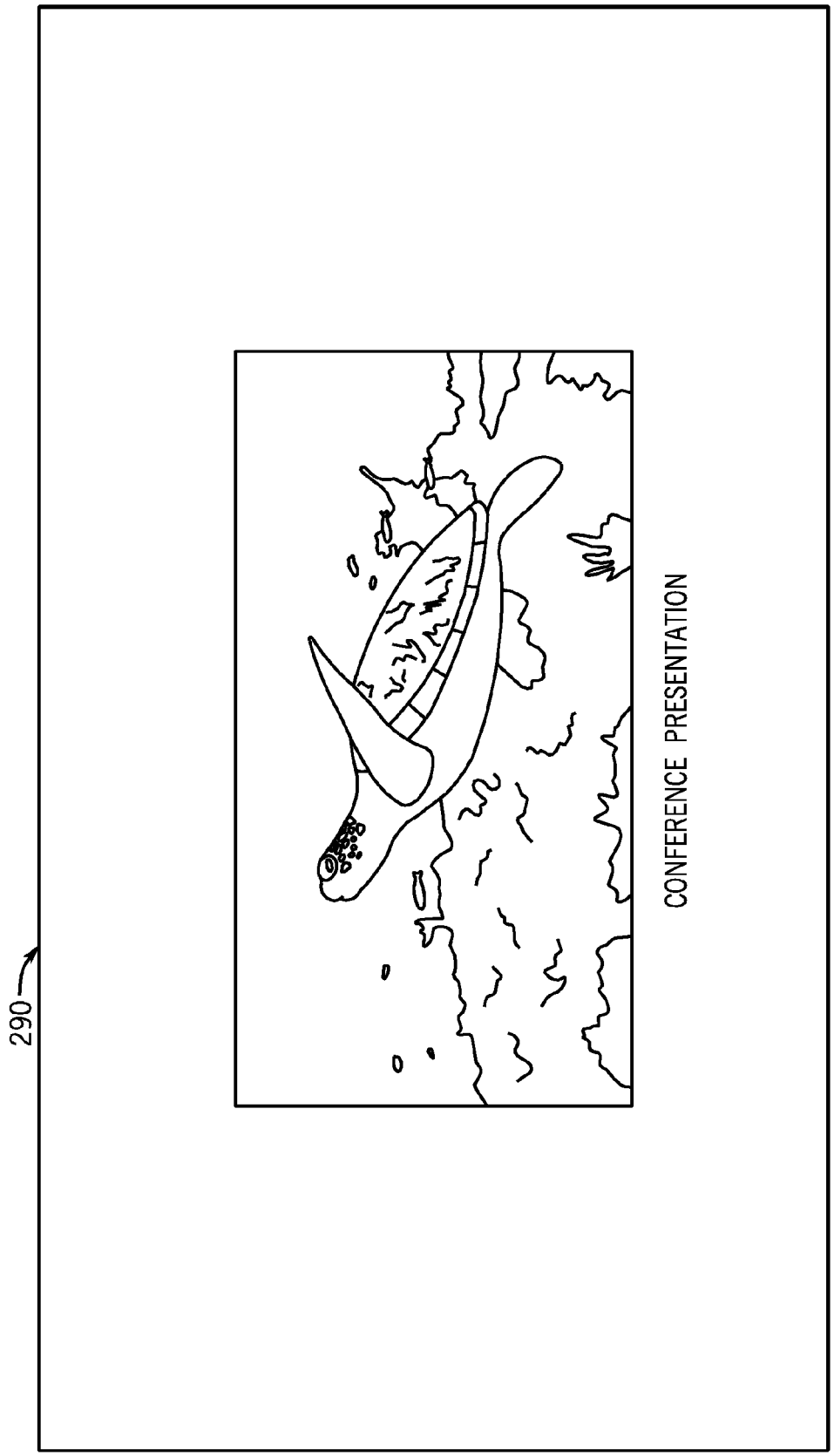
FIG. 8 depicts a screen of a web browser displaying a presentation slide in a full screen mode, in accordance with one embodiment of the present invention.
Figure 9:
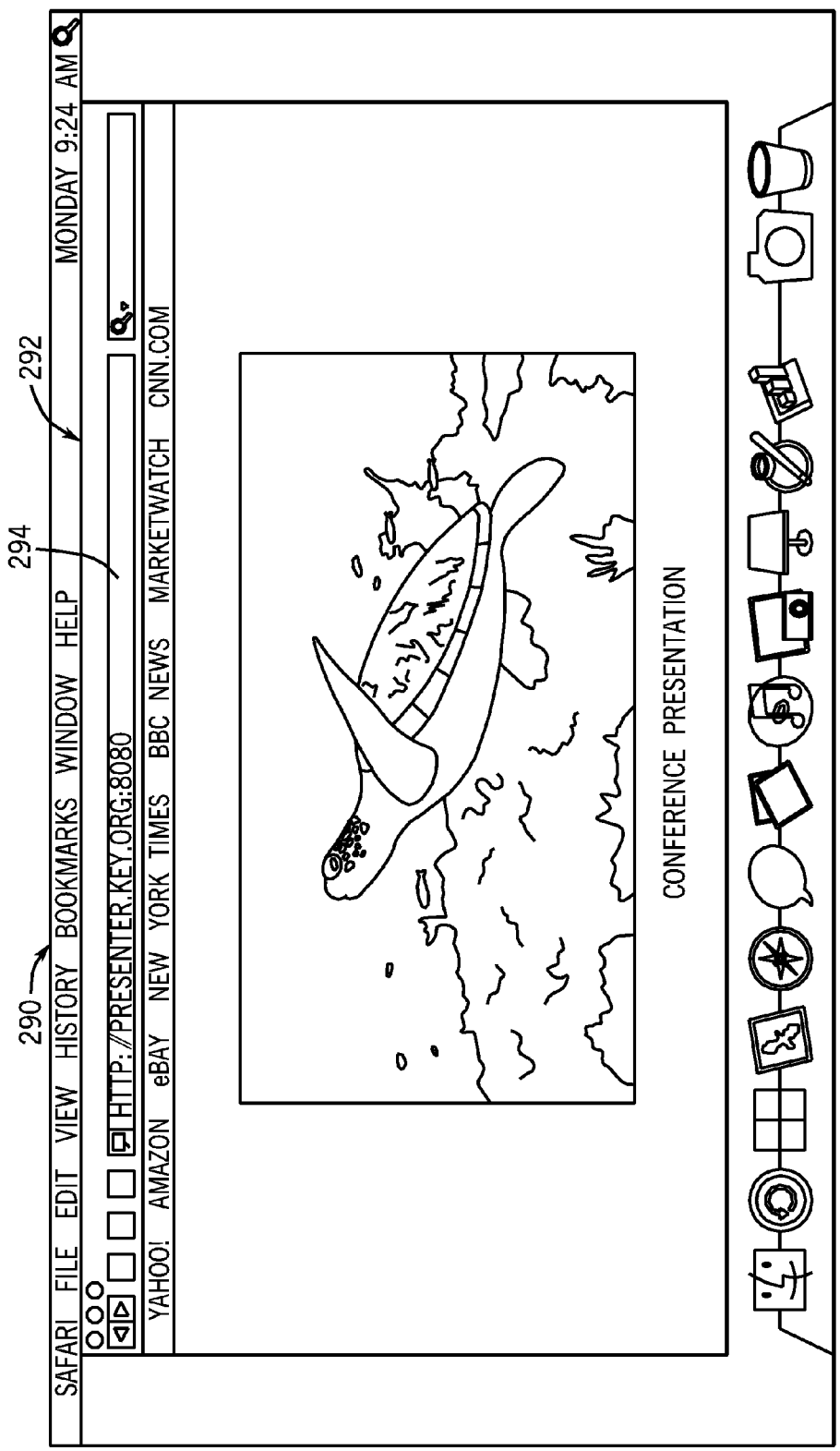
FIG. 9 depicts a screen of a web browser displaying a presentation slide in a window, in accordance with one embodiment of the present invention.

Depending on the settings provided on the presentation application running on the host device 190 and/or on the viewing application running on the remote device 194, the representations of the slides displayed on the remote device 194 may be displayed in a full-screen mode (FIG. 8) after the pass code is accepted and the presentation begins. Alternatively, representations of the slides displayed on the remote device 194 may be displayed in a window, such as a web browser window 292 (FIG. 9).

Figure 10:
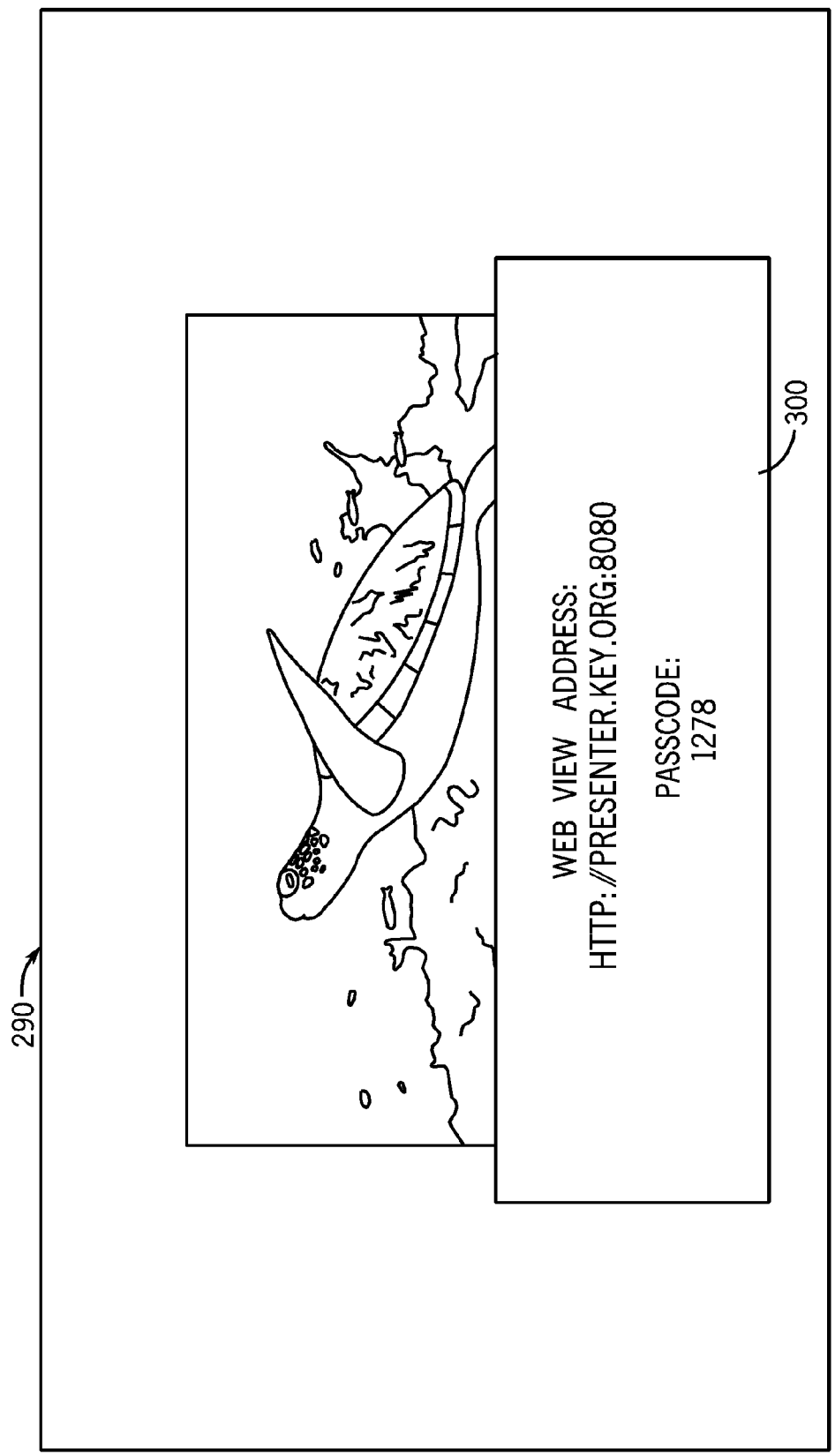
FIG. 10 depicts a screen of a web browser displaying a presentation slide and connection information, in accordance with one embodiment of the present invention.

In one embodiment, a remote viewer may be able to obtain presentation and/or session information during a remote viewing session of a presentation. For example, turning to FIG. 10, a remote viewer may be able to press a key or key combination at the remote device 194 to cause session information 300, such as a URL or pass code, to be superimposed over a current slide being displayed in a full-screen mode. Alternatively, other information such as the title of the presentation, the name of the presenter, the slide number, the number of slides remaining, the elapsed presentation time, the remaining presentation time, and so forth, may be displayed in response to a request by the remote viewer.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electronic device comprising:
   a network interface capable of communicating over a network;
   a memory;
   one or more processors; and
   a non-transitory computer-readable medium including one or more sequences of instructions that, when executed by one or more processors, causes:
   distribute, by presentation application running on the electronic device, one or more images over the network to a viewing application running on a remote electronic device;
   receive a request, over the network, to view a presentation at the remote electronic device running the viewing application;
   in response to the request, establish a communication channel between the presentation application on the electronic device and the viewing application on the remote electronic device;
   obtain one or more indicators of properties of the remote electronic device from the request, the indicators include a speed of a network connection between the electronic device and the remote electronic device;
   select one or more aspects of the one or more images based on the one or more indicators of properties of the remote electronic device, the one or more aspects comprising one or more of a size or a resolution of the one or more images;
   receive a presentation slide or slide build that comprises at least one dynamic element, wherein the at least one dynamic element includes an animation;
   generate at least one of the one or more images based on the presentation slide or slide build and the selected aspects, the at least one image comprising a static representation of the at least one dynamic element of the presentation slide or slide build, wherein the images includes a pre-animation slide image and a post-animation slide image for the remote electronic device to display images of a currently presented slide before and after animation;
   push the one or more images to the viewing application over the communication channel such that a display of the one or more images by the viewing application on the remote electronic device is synchronized with a play of the presentation by the presentation application.

2. The electronic device of claim 1, wherein the request comprises authentication information, wherein the presentation application authenticates the request based upon the authentication information prior to establishing the communication channel.

3. The electronic device of claim 1, wherein each of the one or more images represent a slide or slide build displayed as part of the presentation.

4. The electronic device of claim 1, wherein the one or more aspects of the one or more images pushed to the viewing application are further selected based on a property of the communication channel.

5. The electronic device of claim 1, wherein the presentation application comprises one or more image export routines used to generate the one or more Images.

6. The electronic device of claim 1, wherein the viewing application comprises a web browser, and wherein pushing the one or more images comprises:

generating a web page that includes the one or more images and information for displaying the web page in the browser, the web page formatted in accordance with one or more protocols for communicating web pages to the browser.

7. The electronic device of claim 1, further comprising: receiving a presentation slide or slide build;
generating a plurality of images from the slide or slide build, each of the plurality of images having a different configuration of some or all of the one or more aspects; and
making the plurality of images available to be selected based on the one or more indicators of properties of a remote electronic device that are included in the request.

8. A method for distributing a slide presentation, comprising:
receiving, on a computer, an input configuring a presentation to be distributed over a network by a presentation application running on the computer;
playing the presentation on the computer;
receiving, at the presentation application, a request to view the presentation at a remote electronic device running a viewing application;
in response to the request, establishing a communication channel over the network between the presentation application on the computer and the viewing application on the remote electronic device;
obtaining one or more indicators of properties of the remote electronic device from the request, the indicators include a speed of a network connection between the electronic device and the remote electronic device;
selecting one or more aspects of the one or more images based on the one or more indicators of properties of the remote electronic device, the one or more aspects comprising one or more of a size or a resolution of the one or more images;
receiving a presentation slide or slide build that comprises at least one dynamic element, wherein the at least one dynamic element includes an animation;
generating at least one of the one or more images based on the presentation slide or slide build and the selected aspects, the at least one image comprising a static representation of the at least one dynamic element of the presentation slide or slide build, wherein the images includes a pre-animation slide image and a post-animation slide image for the remote electronic device to display images of a currently presented slide before and after animation;
pushing the one or more images to the viewing application over the communication channel such that a display of the one or more images by the viewing application on the remote electronic device is synchronized with a play of the presentation by the computer.

9. The method of claim 8, comprising: prior to establishing the communication channel, authenticating the request based upon authentication information provided in the request.

10. The method of claim 8, wherein the indicators that are included in the request comprise an indication of a remote display capability for the remote electronic device.

11. The method of claim 8, wherein each of the one or more images represent a slide or slide build displayed as part of the presentation.

12. The method of claim 8, comprising: wherein generating or selecting the one or more images further comprises generating or selecting the one or more images based on one or more properties of the communication channel.

13. The method of claim 8, wherein the one or more images are generated by exporting static images of portions of the presentation corresponding to slides or slide builds.

14. A non-transitory computer-readable media, the non-transitory computer-readable media encoding routines which, when executed on a first machine, cause acts to be performed comprising:
playing a presentation on the first machine;
receiving a request at a presentation application running on the first machine, wherein the request is to remotely view the presentation and is generated by a viewing application running on a second machine in communication with the first machine over a network;
establishing a communication channel between the presentation application on the first machine and the viewing application on the second machine in response to the request;
obtaining one or more indicators of properties of the second machine from the request, the indicators include a speed of a network connection between the electronic device and the remote electronic device;
selecting one or more aspects of the one or more images based on the one or more indicators of properties of the second machine, the one or more aspects comprising one or more of a size or a resolution of the one or more images;
receiving a presentation slide or slide build that comprises at least one dynamic element, wherein the at least one dynamic element includes an animation;
generating at least one of the one or more images based on the presentation slide or slide build and the selected aspects, the at least one image comprising a static representation of the at least one dynamic element of the presentation slide or slide build, wherein the images includes a pre-animation slide image and a post-animation slide image for the remote electronic device to display images of a currently presented slide before and after animation;
pushing one or more images to the viewing application over the communication channel such that a display of the one or more images by the viewing application on the second machine is synchronized with a play of the presentation on the first machine.

15. The non-transitory computer-readable media of claim 14, wherein the one or more indicators identify one or more of the second machine or display characteristics of a display associated with the second machine.

16. The non-transitory computer-readable media of claim 14, wherein encoded routines, when executed on the first machine, cause further acts to be performed comprising:
authenticating the request, based on authentication information included in the request, prior to establishing the communication channel.

17. The non-transitory computer-readable media of claim 14, wherein each of the one or more images represent a slide or slide build displayed as part of the presentation.

18. The non-transitory computer readable media of claim 14, wherein generating or selecting the one or more images further comprises generating or selecting the one or more images based on one or more properties of the communication channel.

* * * * *